United States Patent [19]
Yeckley

[11] Patent Number: 5,925,866
[45] Date of Patent: Jul. 20, 1999

[54] METHOD, APPARATUS AND ARTICLE OF MANUFACTURE FOR DYNAMICALLY POSITIONING MAGNETIC SHIELDING TO REDUCE MAGNETIC INTERFERENCE AT A MAGNETIC READ HEAD

[75] Inventor: Alexander J. Yeckley, North Canton, Ohio

[73] Assignee: International Business Machines Corporation, Armonk, N.Y.

[21] Appl. No.: 08/931,550

[22] Filed: Sep. 16, 1997

[51] Int. Cl.⁶ ...................................... G06K 7/08
[52] U.S. Cl. .......................... 235/449; 235/375; 235/439; 235/493; 400/73
[58] Field of Search .................................... 235/449, 375, 235/376, 379, 435, 436, 438, 439, 450, 476, 479, 483, 493; 902/27; 400/73, 656

[56] References Cited

U.S. PATENT DOCUMENTS

| | | |
|---|---|---|
| 3,092,809 | 6/1963 | Merritt et al. |
| 3,723,669 | 3/1973 | Bose et al. |
| 3,986,000 | 10/1976 | McJohnson ............................. 235/449 |
| 4,012,715 | 3/1977 | Essenmacher ....................... 340/146.3 |
| 4,097,910 | 6/1978 | Lafevers et al. ..................... 235/449 X |
| 4,245,268 | 1/1981 | Toshimitsu ............................... 360/124 |
| 4,734,643 | 3/1988 | Bubenik et al. ..................... 235/449 X |
| 4,748,673 | 5/1988 | Barre et al. ................................. 382/7 |
| 4,984,117 | 1/1991 | Nolke et al. ............................. 360/124 |
| 5,613,783 | 3/1997 | Kinney et al. ...................... 235/449 X |
| 5,634,729 | 6/1997 | Kinney et al. ............................ 400/73 |
| 5,789,727 | 8/1998 | Teradaira et al. ....................... 235/449 |

OTHER PUBLICATIONS

IBM TDB, vol. 7, No. 3, Aug./1964, p. 202 "Preamplifier", Wagner.
IBM TDB, vol. 38, No. 12, Dec./1995, pp. 351–352, "Wafer Design Techniques for Same–Gap–Servo Head".
IBM TDB, vol. 10, No. 3, Aug./1967 "MICR Automatic Gain Control" Arnold.

*Primary Examiner*—Michael G. Lee
*Attorney, Agent, or Firm*—John D. Flynn

[57] ABSTRACT

An apparatus and system for reducing noise detected by a magnetic read head. In particular it relates to reducing magnetic interference at a magnetic read head by dynamically positioning a piece of highly permeable nickel-copper alloy near the magnetic read head thereby shunting the interfering magnetic radiation away from the read head.

14 Claims, 9 Drawing Sheets

METHOD, APPARATUS AND ARTICLE OF MANUFACTURE FOR DYNAMICALLY POSITIONING MAGNETIC SHIELDING TO REDUCE MAGNETIC INTERFERENCE AT A MAGNETIC READ HEAD

BACKGROUND OF THE INVENTION

1. Field of the Invention

The present invention relates to reducing the magnetic noise received at a magnetic read head. More particularly, it relates to a method, apparatus and article of manufacture for reducing magnetic interference at a magnetic read head by dynamically positioning a piece of highly permeable nickel-copper alloy near the magnetic read head thereby shunting the interfering magnetic radiation away from the read head.

2. Description of the Prior Art

Magnetic Ink characters are characters or symbols which are printed on a document in magnetic ink. Documents containing magnetic ink characters are typically bank checks, deposit slips and other documents. The magnetic ink characters may be printed in a standardized format or font (e.g., "E13B" or "CMC7" font) and are typically located near an edge of a document.

The magnetic ink characters are read by a magnetic head as the head moves across the document or the document is caused to move pass the head. The magnetic signals "picked up" by the head are converted to electrical signals which are processed by a magnetic ink character recognition unit which outputs the characters typically in ASCII or EBCDIC format.

Document processing systems with a MICR capability can be affected by magnetic interference which slows or prevents magnetic ink characters from being read. Magnetic sources, for example electromagnetic coils, generate magnetic fields resulting in interference relative to the magnetic information stored in the magnetic ink portion of a document. These interference signals may arise from nearby equipment such as displays, scanners, the MICR processing system itself, or motors and other electromechanical devices that may be used to move documents, etc.

This is a problem in Point-of-Sale (POS) environments where MICR readers are typically located very near a check out display and where MICR information is obtained from checks tendered by customers. Due to lack of aisle space or the desire to more efficiently utilize floor space POS systems deployment usually result in the MICR or MSR device in close proximity to a CRT or other POS peripheral devices. When a MICR read head is located close to a display device, the display interference caused by the flyback or the retrace signal from the operation of the CRT results in magnetic interference. The deflection coils in the CRT present a significant amount of noise to the MICR read head. Most POS systems also permit the display to be moved which changes the noise characteristics received by the magnetic read head.

One prior art solution to this problem is to use shielding. The source of the radiation, such as a display or other form of coil, is shielded or the magnetic read head itself is shielded or partially shielded. Shielding can be used on the source or the pickup or a combination of both can be utilized. Because complete shielding is not possible, shielding does not eliminate the interference problem but, merely reduces the interference signal picked up by the magnetic read head. Furthermore, shielding is costly to implement given the high cost of the metal shielding material used and the extra steps required to apply shielding during the manufacturing process. Shielding can also cause other problems such as overheating of components.

Another prior art solution is to add a second magnetic read head that is used to measure the magnetic interference signal. The electrical signal generated by the second magnetic read head can then be subtracted from the signal containing both the magnetic interference and the MICR characters. This solution requires a second read head and a means for subtracting one signal from the other. Additionally, this technique is imperfect because the two read heads cannot occupy the same physical space so that the interference signal pickup by the second read head may be substantially different then the interference picked up by the first magnetic read head. This is because the magnetic interference signals are different at the two locations. Thus, the use of two heads can result in self-interference.

Another prior approach is to restrict the user of the MICR or MSR to very specific system arrangements, including acceptable add on products and accessories in the vicinity of the reader as well as their allowable positions. This restricts the user and limits the number and type of add-on products in the user's system configurations.

Each of the above techniques can result in a solution if the source-to-receiver orientation remains fixed. However, in the POS environment the position of the CRT can and does change. Thus any given shielding solution will require some changes for each new position of the CRT.

These unresolved problems and deficiencies are clearly felt in the art and are solved by the invention in the manner described below.

SUMMARY OF THE INVENTION

The above-mentioned needs have been met in accordance with the present invention by providing a method, apparatus and article of manufacture for it relates to a method, apparatus and article of manufacture for reducing magnetic interference at a magnetic read head by dynamically positioning a piece of highly permeable nickel-copper alloy near the magnetic read head thereby shunting the interfering magnetic radiation away from the read head.

An apparatus for decoding magnetically encoded information having a magnetic read head for providing a time varying electrical signal; a piece of magnetic shielding material mounted on a carrier; means for measuring the background noise; means for positioning the carrier along at least one axis relative to the magnetic read head; means for determining a position for the carrier by positioning the carrier at one or more positions and measuring the background noise at each position and selecting a carrier position based on the noise measurements; wherein said carrier is positioned by the positioning means at the selected position prior to decoding of magnetically encoded information.

A method for reducing background magnetic noise present at a magnetic read head the method comprising the steps of: positioning a piece of magnetic shielding material at each of a plurality of locations; obtaining a noise measurement at each of the plurality of locations; selecting a location from the plurality of locations based upon the noise measurements; and, positioning the magnetic shielding material at the selected location prior to using the magnetic read head for decoding of magnetically encoded information.

An article of manufacture comprising a processor useable medium having a processor readable program embodied in said medium, wherein the processor readable program when executed on a processor causes the processor to: position a piece of magnetic shielding material at each of a plurality of locations; obtain a noise measurement at each of the plurality of locations; select a location from the plurality of locations based upon the noise measurements; and, position the magnetic shielding material at the selected location prior to using the magnetic read head for decoding of magnetically encoded information.

A point of sale printer having a document drive means, for moving documents inserted into the printer along a document travel path; a magnetic reader positioned at a predetermined longitudinal position in said document travel path for providing a time varying electrical signal; a print head positioned at said predetermined longitudinal position in said document travel path, and wherein said print head is laterally offset from said magnetic reader; a piece of magnetic shielding material attached to the print head; means for measuring the background noise; means for positioning the print head along at least one axis relative to the magnetic reader; a carrier position determination module for causing the carrier position controller to position the carrier at a plurality of positions and cause the background noise module to determine background noise at each of the plurality of positions and to select a carrier position from the plurality of positions using the determined background noise, and then positioning the carrier at the selected position prior to reading a MICR document; and wherein said print head is positioned by the positioning means at the selected position prior to decoding of magnetically encoded information.

It is an object of the present invention to provide a magnetic read system which can operate precisely and accurately even in the presence of magnetic interference fields.

It is yet another object of the present invention to provide cost effective noise immune decoding of magnetically encoded signals.

It is a further object of the present invention to provide a magnetic read system which can operate precisely and accurately even in the presence of magnetic interference fields without the use of a second magnetic read head.

It is a further object of the present invention to provide a magnetic read system which can operate precisely and accurately without the use of large amounts of magnetic shielding material.

It is yet another object of the present invention to reduce the interference of magnetic noise received at a magnetic read head.

It is an object of the present invention to provide more accurate reading of magnetic ink characters.

It is yet another object of the present invention to read magnetic ink characters with a reduced error rate.

BRIEF DESCRIPTION OF THE DRAWINGS

The foregoing and other objects, aspects and advantages of the invention will be better understood from the following detailed description with reference to the drawings, in which.

DETAILED DESCRIPTION

The present invention will be described with respect to a Point-of-Sale (POS) Printer having a Magnetic Ink Character Recognition (MICR) device. The present invention is also applicable to other types of magnetic read devices including but not limited to magnetic tape heads, magnetic disks, magnetic strip readers (MSR), digital audio tape readers, or other electronic devices that operate in environments subject to magnetic interference.

Using MICR technology, information is encoded on a surface using magnetic ink and an associated font. The fonts permit electrical signals obtained from a MICR read head to be more easily distinguished from one other. Magnetic ink characters generate particular electrical wave form signals when the characters are moved relative to the M1CR read head. E13B is a font which is used for processing of checks in the United States. Although MICR is particularly useful in the processing of checks there are many other applications that make use of MICR technology and to which the present invention is also applicable.

Figure 1:
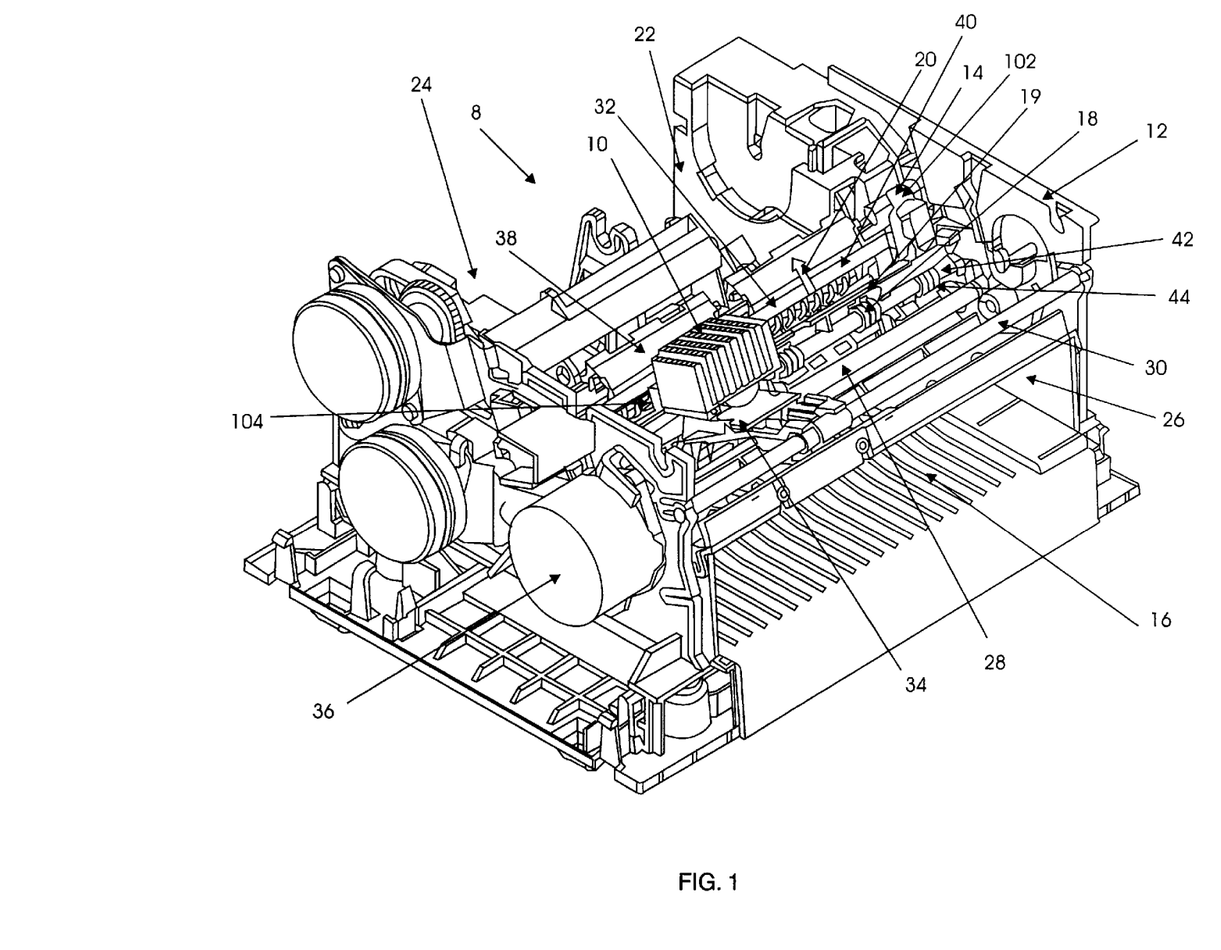
FIG. 1 is a perspective view illustrating an embodiment of the point of sale printer with MICR system of the present invention.
Figure 8:
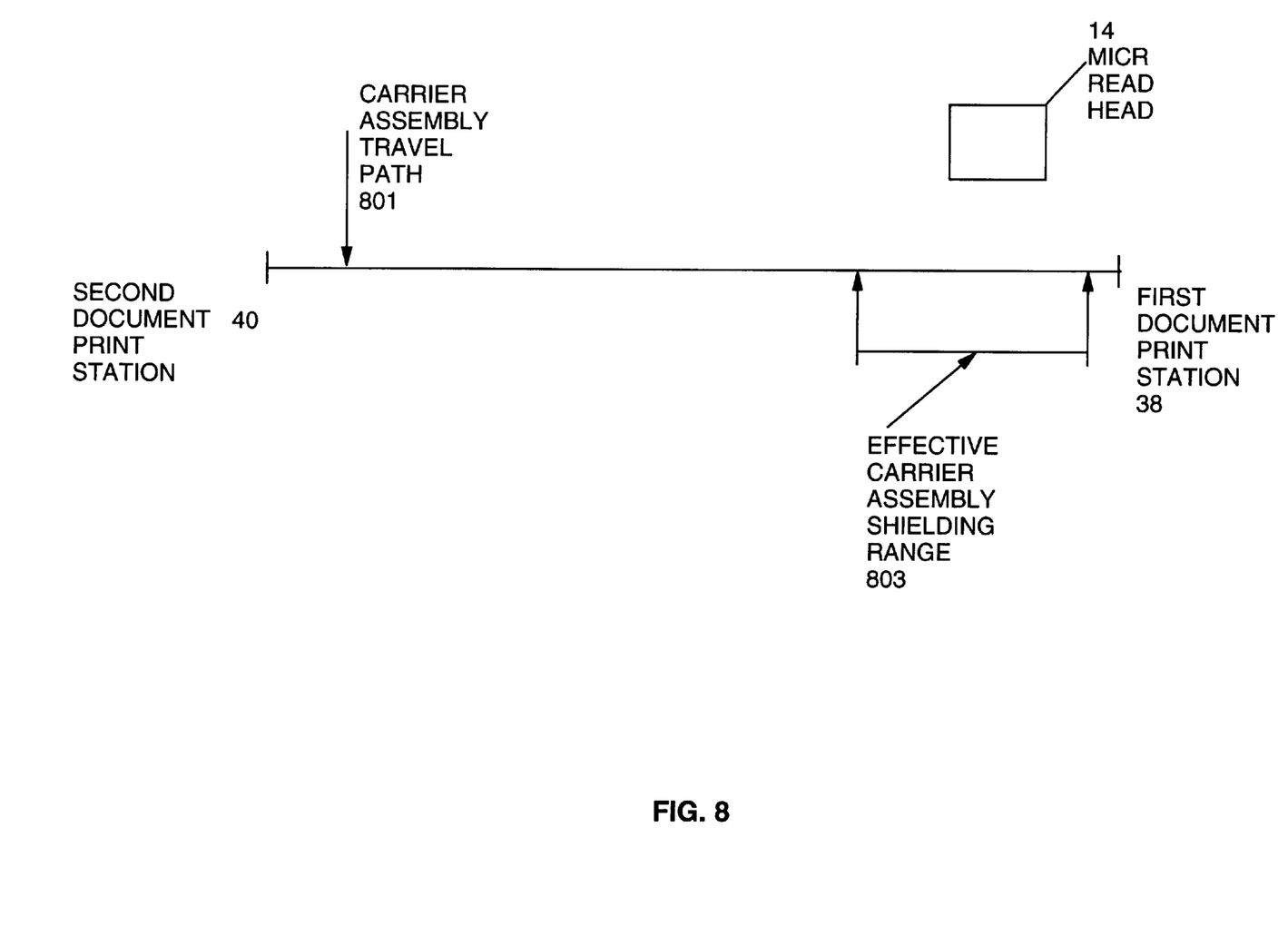
FIG. 8 indicates the relationship between the effective range and the complete range of movement for the print carrier assembly.
Figure 9:
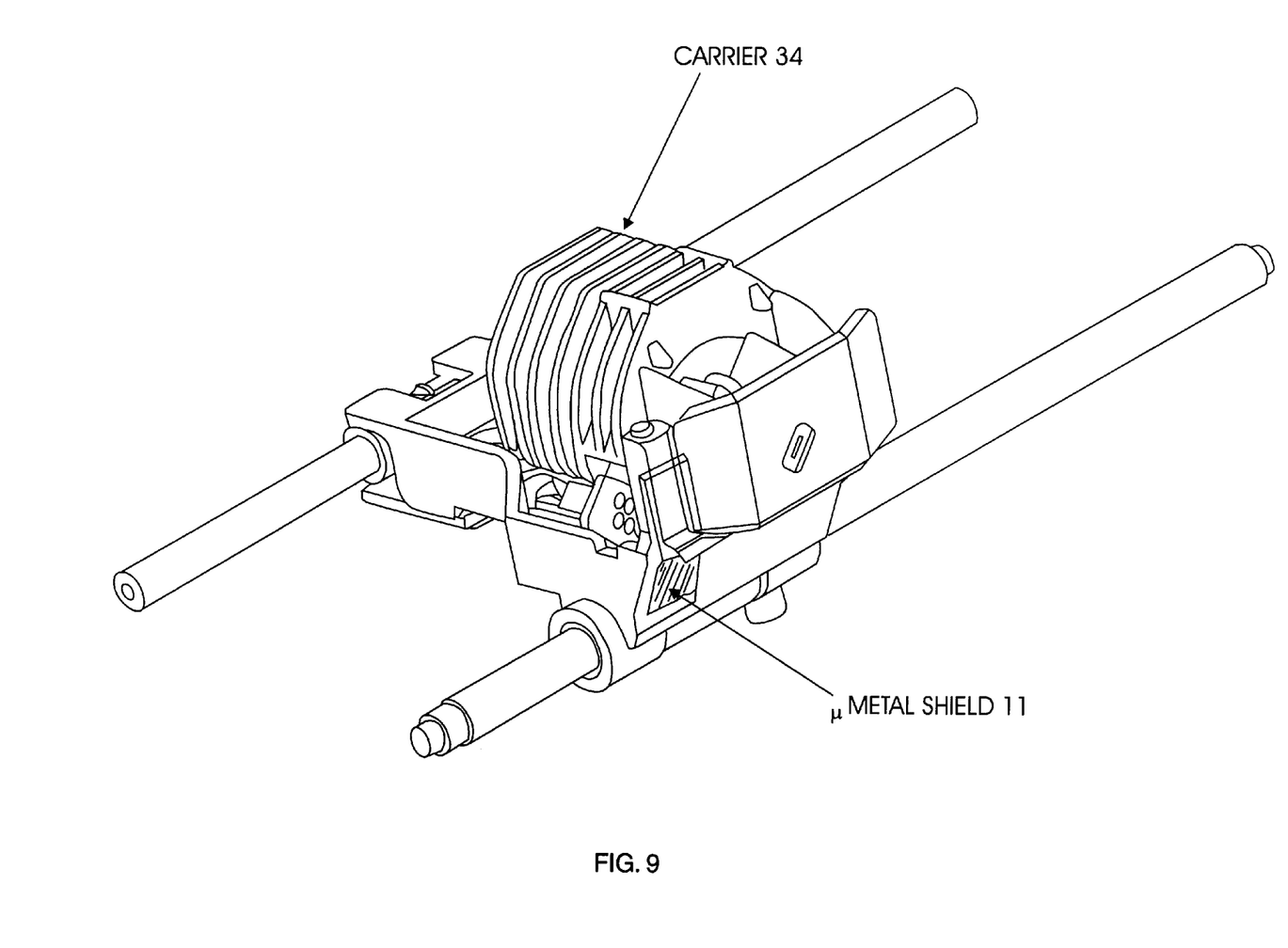
FIG. 9 indicates one embodiment of the magnetic shielding material and the carrier.

To illustrate the present invention it will now be described with respect to a point of sale printer with a magnetic reader. A Point of Sale Printer with Magnetic Reader is described in U.S. Pat. No. 5,613,783 entitled "A Point of Sale Printer with Magnetic Reader" which issued Mar. 24, 1997 and is hereby incorporated by reference. FIG. 1 depicts a perspective view of an embodiment of a POS printer with magnetic reader. As shown in FIG. 1, magnetic shielding material 11, print head 10 and magnetic reader 14 are contained within housing 12. The shielding material 11 cannot be seen from the perspective shown in FIG. 1 as it is attached to a side of the carrier 34 that is not shown. The shielding material 11 along with another embodiment of the print head carrier 34 is depicted in FIG. 9. Housing 12 further includes document insertion region 16. Documents inserted into insertion region 16 are moved between pressure roller 18 and document feed roller 19 at least one of which is powered, or other document drive means, to allow documents inserted into the printer of the present invention to be moved along document travel path 20 (represented figuratively by a directional arrow) past print head 10 and magnetic reader 14. Magnetic reader 14 is mounted at a position within the document travel path 20 such that a document containing magnetic ink characters will have its magnetic character portions pass near the magnetic read head when the document is moved along the document travel path 20. The print head 10, and thus the magnetic shielding material 11 (see FIG. 9), can be located at any printable position perpendicular to the travel path. The position of carrier 34, and thus the magnetic shielding material 11 and print head 10, in the document travel path 20 overlaps the position of magnetic reader 14 with the print head 10 and magnetic shielding material 11 laterally offset from the magnetic reader 14. The relationship between the magnetic reader 14 and carrier 34 having the magnetic shielding material 11 is also shown in FIG. 8. As shown in FIG. 1, housing 12 includes additional document insertion regions 24 and 22 particularly adapted for use with paper rolls such as those used for customer receipts or journal records. Document insertion region 16 is adapted to sheet feed documents such as forms or checks and includes alignment edge 26 for positioning documents fed through document insertion region 16 laterally with respect to document travel path 20.

Figure 2:
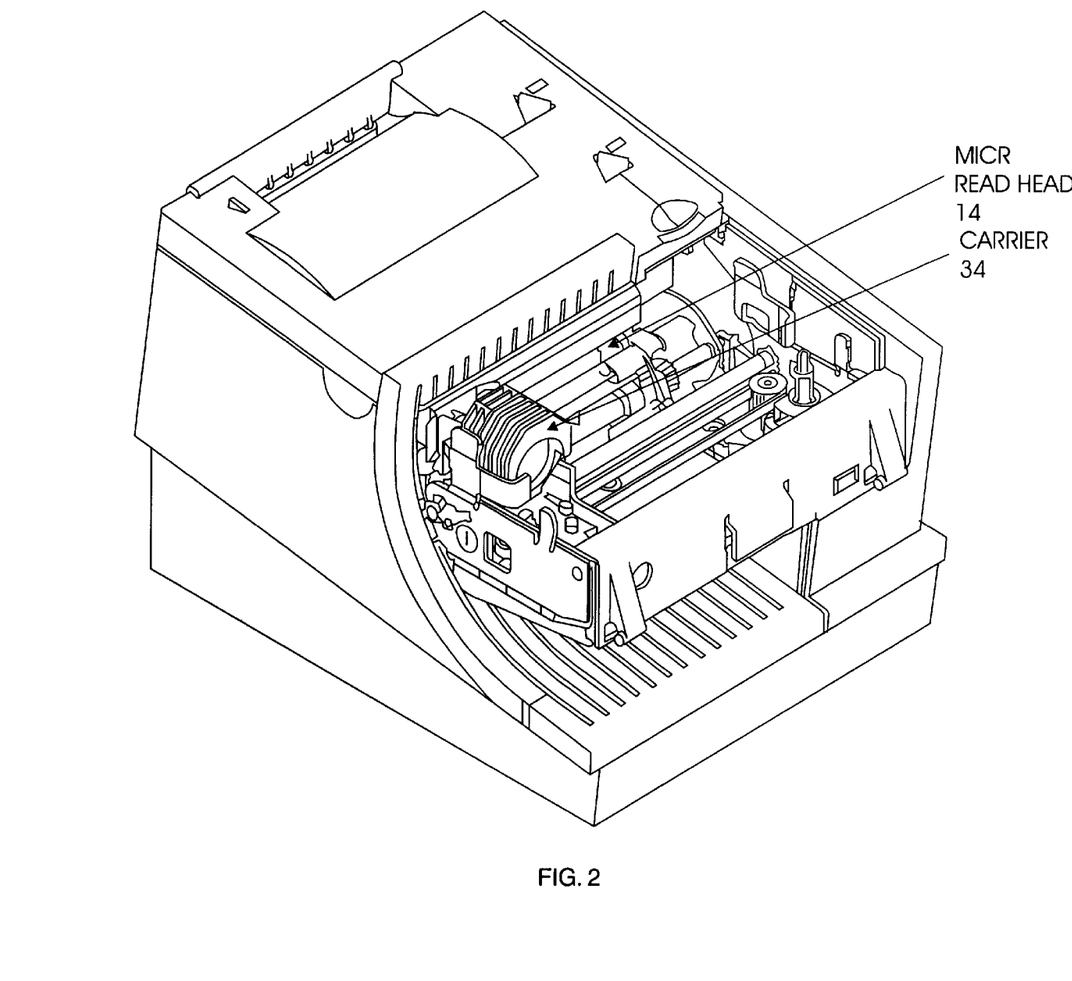
FIG. 2 depicts a perspective illustrating another embodiment of a of the point of sale printer with MICR system of the present invention.

The magnetic shielding material 11 and print head 10 are mounted on print head carrier 34 which is movably mounted on transport guide shafts 28 and 30. (See FIG. 9) Print head 10 is located adjacent platen 32 and spaced from platen 32 a sufficient distance to allow documents inserted into the printer to pass between print head 10 and platen 32 along document travel path 20. For the dot matrix type print head illustrated in FIG. 1, motor 36 or other print head drive means, moves print head 10 and the magnetic shielding material 11 laterally from a first document print station 38 to allow printing of customer receipts, journal records or other documents, as illustrated in FIG. 1, to a second document print station 40 laterally displaced from first document print station 38 relative to document travel path 20 and proximate magnetic reader 14 to allow printing on checks. First document print station 38 and second document print station 40 may be understood to be respective portions of a single laterally extending print region over which print head 10 travels to allow the printer of the present invention to function as a standard printer for full width documents such as 8½"×11" sheets of paper for the printer illustrated in FIG. 1 or as a receipt printer on 3½" width paper as shown in FIG. 2. The relationship between the magnetic reader 14 and print region or print head path is depicted in FIG. 8. Transport guide shafts 28 and 30 are mounted in housing 12 so as to maintain the spacing of print head 10 from platen 32 during lateral movement of print head 10. The carrier 34, and thus the print head 10 and magnetic shielding material 11 can be positioned within the print region by controlling the carrier drive means. If a step motor is utilized then movement can be finely controlled down to movement provided by one step of the motor.

The MICR read head 14 can read MICR characters from documents feed through the document insertion region 16. The MICR device is designed to read MICR characters encoded on the check. The printer may then print necessary information such as payee, amount and date on the check. The present invention makes use of the print head carrier 34 by mounting a piece of magnetic shielding material 11 on the print head carrier 34. (See FIG. 9) The print head carrier 34 can then be positioned at a point within the print region to reduce magnetic interference at the MICR read head 14. Prior to reading MICR characters from a document, the carrier 34 and attached magnetic shielding material 11 is positioned at a location that reduces magnetic interference at the magnetic read head 14. The position may be established just prior to reading the MICR document or at some other time. It should be noted that the magnetic background noise can change over time as components are moved, systems are turned on and off, and other sources of magnetic noise change. Most POS systems come equipped with a display that may be moved by the cashier or a customer. Moving the display may effect the background noise picked up at the MICR read head. Also, the magnetic shielding material can be positioned so as to increase rather than reduce the amount of magnetic interference. This can result from a position being established for one set of magnetic interference conditions and having these conditions change. The position of the carrier and thus the magnetic shielding, should be updated when environmental conditions change or on a periodic basis.

Figure 3:
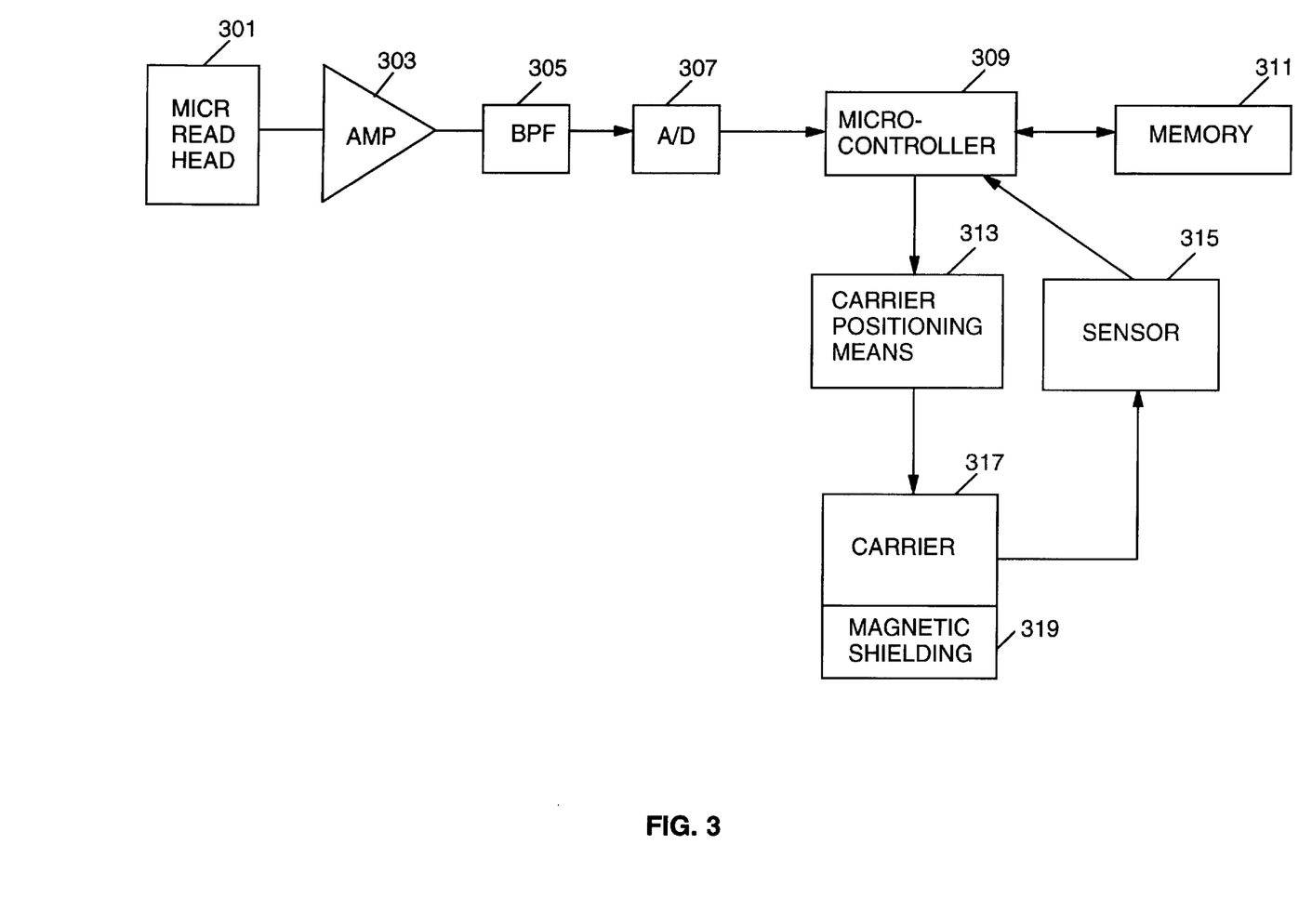
FIG. 3 depicts a functional block diagram of the present invention.

FIG. 3 depicts a functional block diagram of the present invention. The magnetic read head 301 provides a time varying analog signal that is proportional to the magnetic field sensed at the read head. The time varying electrical signal produced by the magnetic read 301 is amplified by amplifier 303. In the preferred embodiment the amplifier supplies a time varying signal in a certain voltage range such as 0 to +5 volts. The amplifier produces an amplified time varying signal that is offset by a voltage of 2.5 volts. The offset voltage assures that the time varying signal at the amplifier output is positive and can be provided by a single-ended operational amplifier using a single voltage. The amplified time varying signal (or the time varying signal from the read head) may also pass through a band pass filter 305. The bandpass filter reduces noise picked up by the magnetic read head 301 by suppressing certain frequency components from the time varying analog signal. The MICR head performs best with a constant document speed. In general, as velocity increases so does the signal to noise ratio. Typically a speed of 5 inches per second is used. Although, in the preferred embodiment the bandpass filter is implemented using analog circuit elements the bandpass filter could be implemented using the DSP with a bandpass filter software function. In the preferred embodiment the resulting signal from the amp and bandpass filter is usually between 0 and +5 volts. This time varying signal is then sent to A/D converter 307 which converts the analog voltage to digital samples. In the preferred embodiment, the A/D converter provides 8 bits per sample at 200 microsecond intervals. The digital samples are then provided to microcontroller 309. The microcontroller 309 has access to memory 311 and stores each sample from the A/D converter in the sample storage area 311. The samples are typically written to memory in successive fashion. This preserves the timing relationship between samples.

The microcontroller also can control the position of the carrier 317 via the carrier positioning means 313 or some other means for positioning the carrier within the moveable region. The carrier positioning means may be a motor or step motor for moving the carrier. In the preferred embodiment the carrier is moved by a stepper motor under microprocessor control. The stepper motor is a four phase, unipolar design where two phases are energized at a time. An open loop chopper is used to control the energy supplied to the motor. Acceleration/deceleration pulses are varied to compensate for the variable torque requirements during these periods. All drive signals to the motor are generated by a microprocessor.

The microcontroller can position the magnetic shielding material by controlling the position of the carrier. In the preferred embodiment the carrier is the print head assembly of a POS printer. The micro-controller may also receive position information via optional sensor 315. The microcontroller 309 may also be coupled to other sensors for sensing when documents are inserted and the position of documents in the document path. In the preferred embodiment the microcontroller 309, A/D Converter 307, and memory 311 are included in the same integrated circuit (IC) as a microcontroller package. These functions may also be implemented using a Digital Signal Processor (DSP).

The preferred embodiment of the present invention contains one or more software systems or software components or functions. In this context, a software system is a collection of one or more executable software programs, and one or more storage areas (for example, RAM, ROM, cache, disk, flash memory, PCMCIA, CD-ROM, Server's Memory, ftp accessible memory, etc.) In general terms, a software system should be understood to comprise a fully functional software embodiment of a function or collection of functions, which can be added to an existing processing system to provide new function to that processing system. Software systems generally are constructed in a layered fashion. In a layered system, a lowest level software system is usually the operating system which enables the hardware to execute software instructions. A software system is thus understood to be a software implementation of a function which can be carried out in a processor system providing new functionality. Also, in general, the interface provided by one software system to another software system is well-defined. It should be understood in the context of the present invention that delineations between software systems are representative of the preferred implementation. However, the present invention may be implemented using any combination or separation of software and/or data and/or hardware systems. The software systems may be distributed on a computer usable medium such as floppy disk, diskettes, CD-ROM, PCMCIA cards, flash memory cards and/or any other computer usable medium. Note that the software system may also be downloaded to a processor via a communications network or from an Internet node accessible via a communications adapter.

Figure 4:
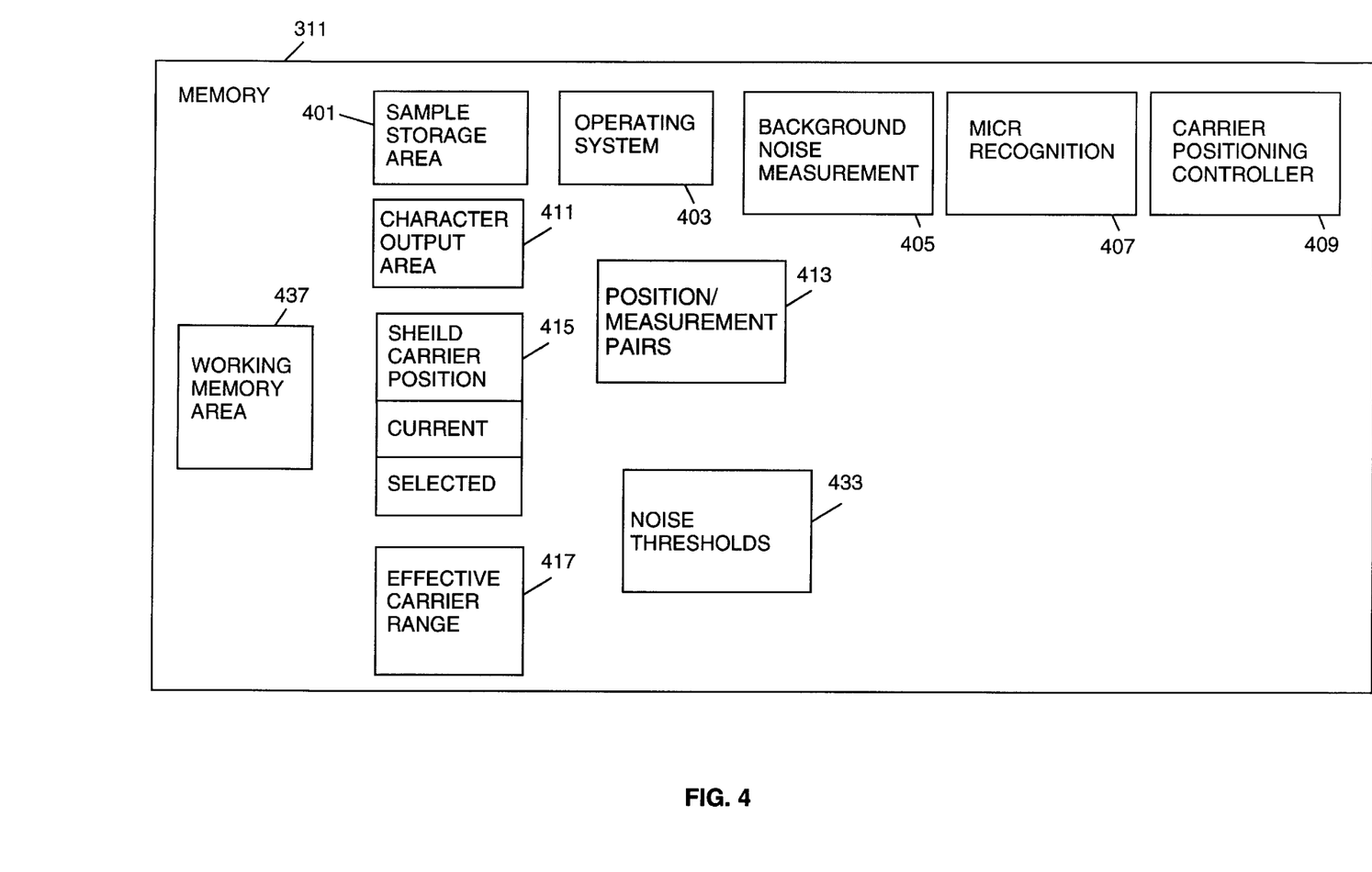
FIG. 4 depicts a functional block diagram of the software systems and storage areas located in the micro-controller memory.

FIG. 4 depicts several different software systems then can be carried out by the microcontroller including: the operating system 403, background noise measurement 405, MICR recognition 407, and carrier positioning controller 409. Other areas of memory are shown for storing data such as: sample storage area 401, character output area 411 shield carrier position 415 (including the current position and the selected position), effective carrier range 417, the position measurement pairs 413, noise thresholds 433, and working memory area 431. Other storage areas may be utilized as well, for instance the MICR recognition function may use magnetic ink font profiles that are stored in a memory area. A printing function and host response function may also be located in memory along with other functions. The operating system 403 enables the microcontroller to boot up and communicate with the hardware. A boot portion of the operating system 403 is stored in non-volatile memory. The background noise measurement system 405 is responsible for collecting samples or initiating sampling and/or generating a noise value given a number of samples or an appropriate time interval. The MICR recognition system 407. The carrier positioning controller system 409 is responsible for determining a carrier position that reduces noise at the MICR read head. This system makes use of the background noise measurement system 405 and is capable of causing the carrier to move. This system is also responsible for moving the carrier to the selected carrier position prior to reading a MICR document.

When reading MICR data from a document the stored samples are processed by MICR recognition system to output characters. In accordance with the present invention before a MICR document is read the print head carrier with the magnetic shielding material will be located at a position that reduces magnetic interference at the magnetic read head. The determination of where to position the carrier assembly may be performed using a variety of techniques at various different times or in response to one or more cues. The determination of where to position the magnetic shielding material can be performed periodically (i.e., at the expiration of a fixed time interval) or in response to various cues (i.e., printer boot up, response to MICR read command, after POS boot up, after several misreads, when background noise exceeds a threshold, when the display position changes, etc. . . . ). If a position is determined before each MICR document read then the position determination should not take more than a second or so, to minimize waiting at the checkout counter. This may entail use of a shorter noise interval (fewer samples) or fewer carrier positions where background noise is measured. Assuming the MICR device or POS printer is controlled by another device such as a POS system or host device, the other device normally will issue a MICR read command upon detection of a document or as part of POS transaction processing. The microcontroller can use the command or detection of the document or activation of the document feed motor(s) or some other cue to start determining a suitable carrier position.

Regardless of when a shielding position is determined, background noise for a given carrier position must be determined. Having caused the carrier and thus the magnetic shielding material to be positioned at a given location, background noise received at the MICR read head for that carrier position must be measured. In the preferred embodiment background noise is determined by collecting and then analyzing one or more samples over a time period $T_n$. Assuming a constant sampling rate, $T_n$ corresponds to N samples. Collecting samples may include initiating sampling and/or storage of samples. There is no minimum required time period. Test monitors have indicated a periodic noise rate of about 15 ms, thus a 7.5 ms period could be used without any problems in order to capture periodic noise from the display. The present invention uses a preferred time period range of from 7.5–100 ms. The collected samples are then used to determine the background noise level. The background noise can represented by selecting the peak sample value or an average sample value (Σsample values/N) or counting the number of samples over a threshold value or some other technique. In the preferred embodiment the peak sample value is used as a measure of the background noise.

Figure 5:
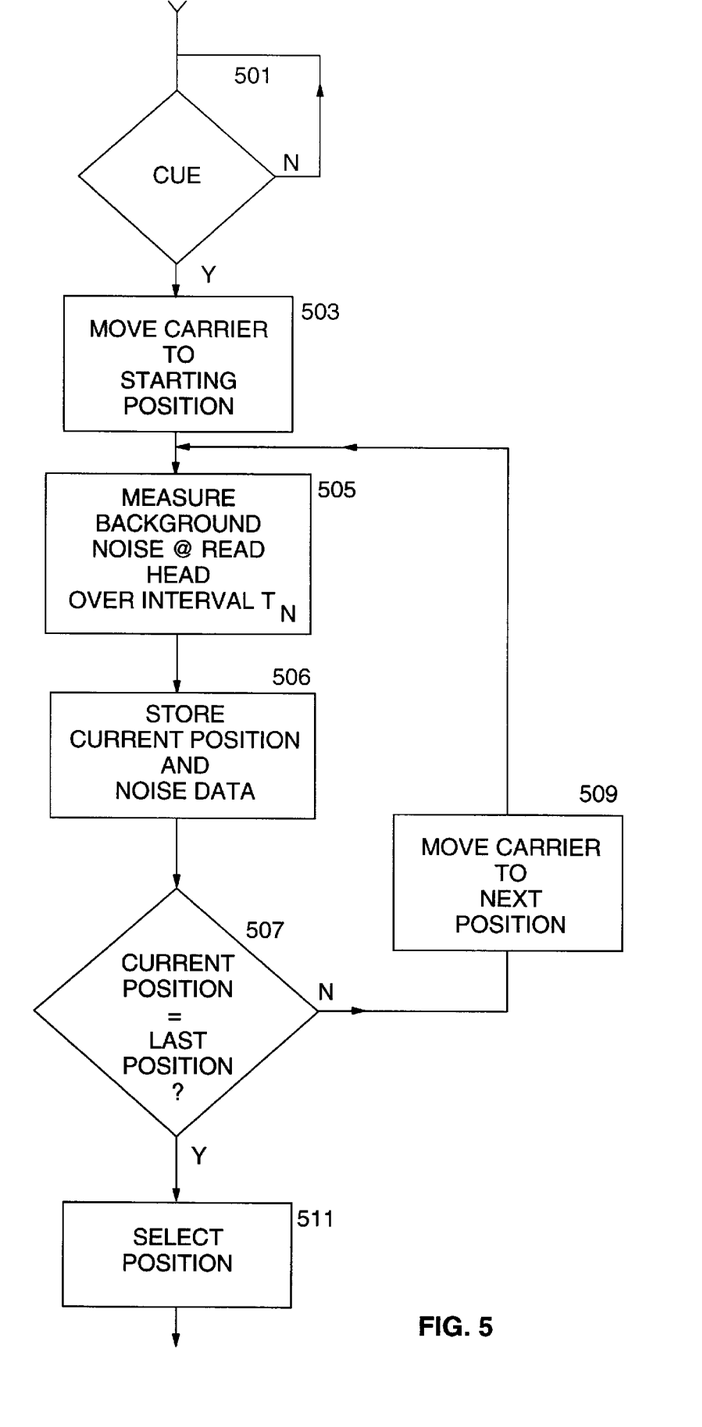
FIG. 5 is a flow chart illustrating an embodiment of the method of the present invention.

FIG. 5 depicts one embodiment of the present invention for determining a position for the carrier that reduces background noise at the read head. In this particular embodiment the microcontroller positions the carrier with magnetic shielding material at various positions and measures the magnetic background interference at each of these positions. The positions and associated noise measurements may be stored in a table. As an alternative to storing the position, the values (e.g., motor steps, voltage, etc. . . . ) required to move or place the carrier in that position could be stored in lieu of or along with the position. A position is then selected. The position may be selected using various criteria. For instance, the position with the lowest noise value or the position with the lowest noise value taking into account noise values at one or more neighboring positions or some other technique. A position within a wide null (i.e., a position having other positions surrounding it with low noise values) may be more desirable than one with high noise values in surrounding positions. The selected position may be stored as the shielding carrier position. If a wide range of null positions is available than the position farthest from the read head is more desirable because it can reduce the potential for increasing the magnetic noise at the read head. This is because there are certain carrier positions that can increase the magnetic noise at the read head rather than decrease the noise at the read head.

In the preferred embodiment the position associated with the lowest background noise measurement is selected and stored. Before reading a document containing magnetic ink characters the carrier is moved to the selected position. This method is depicted in FIG. 5. In step 501, the shield position determination process is initiated by some sort of cue (i.e., timer expiration, printer boot up, MICR read command, etc. . . . ). In step 503 the magnetic shield carrier is moved to a first position from which background noise measurements will be taken. In step 505 the background noise is measured over interval $T_n$. Note that based on the cue, $T_n$ may vary. The interval may be shorter if a carrier shielding position is to be determined prior to each MICR document read. In step 506 the position and noise measurement is stored. Note that in step 506, the method need only store one position/noise measurement pair, the best so far, if the selection criteria permits. If the selection criteria requires locating the position within a wide null then more position measurement pairs will be required. In step 507 a check is made to determine whether the current position is the last position or limit of carrier travel. If not, the carrier is moved to the next position in step 509 and the noise is measured at this new position in step 505 and stored in step 506. Note that the distance the carrier is moved is limited only by the capabilities of the carrier positioning means and the time limit specified for providing the selected carrier position. A shorter time requirement may entail less points or less samples per position or a larger step size $\Delta D$ or a shorter step size $\Delta D$ over a smaller distance. If a step motor is used to position the carrier then carrier position can be changed by a single motor step if desired. This processing continues until noise measurements have been obtained at all desired positions. Having obtained background noise measurements for all desired carrier positions a carrier position is selected in step 511 using one or more criteria. The select carrier position function may make use of all possible positions or a subset (i.e., collected within a specific time interval, within the effective range, etc. . . . ) The number of positions is determined by the time limit specified, the noise interval and the spatial resolution of the carrier positioning means.

FIG. 8 shows a diagram that indicates that the carrier, and the magnetic shielding material can be positioned between the first document position 38 and the second document position 40. Thus, the carrier can be positioned within carrier range 801. However, only the portion of the carrier path that is in the near vicinity of the magnetic read head will have a practical effect on the background noise picked up by the read head 14. This is defined as the effective range 803 of carrier motion. The effective range will vary depending on the size of the magnetic shielding material and its orientation with respect to the magnetic read, the characteristics of the read head and associated electronics, and other factors will impact the effective range. The effective range 803 can be established via experimentation and stored in memory or determined at boot up by taking measurements. To expedite determination of a noise reducing carrier position, only positions within the effective range can be measured. This results in a reduction in the number of carrier positions for which background noise measurements are measured. The carrier can be moved to all positions, given the resolution of the carrier positioning means, within the effective range or a subset of positions.

Figure 6:
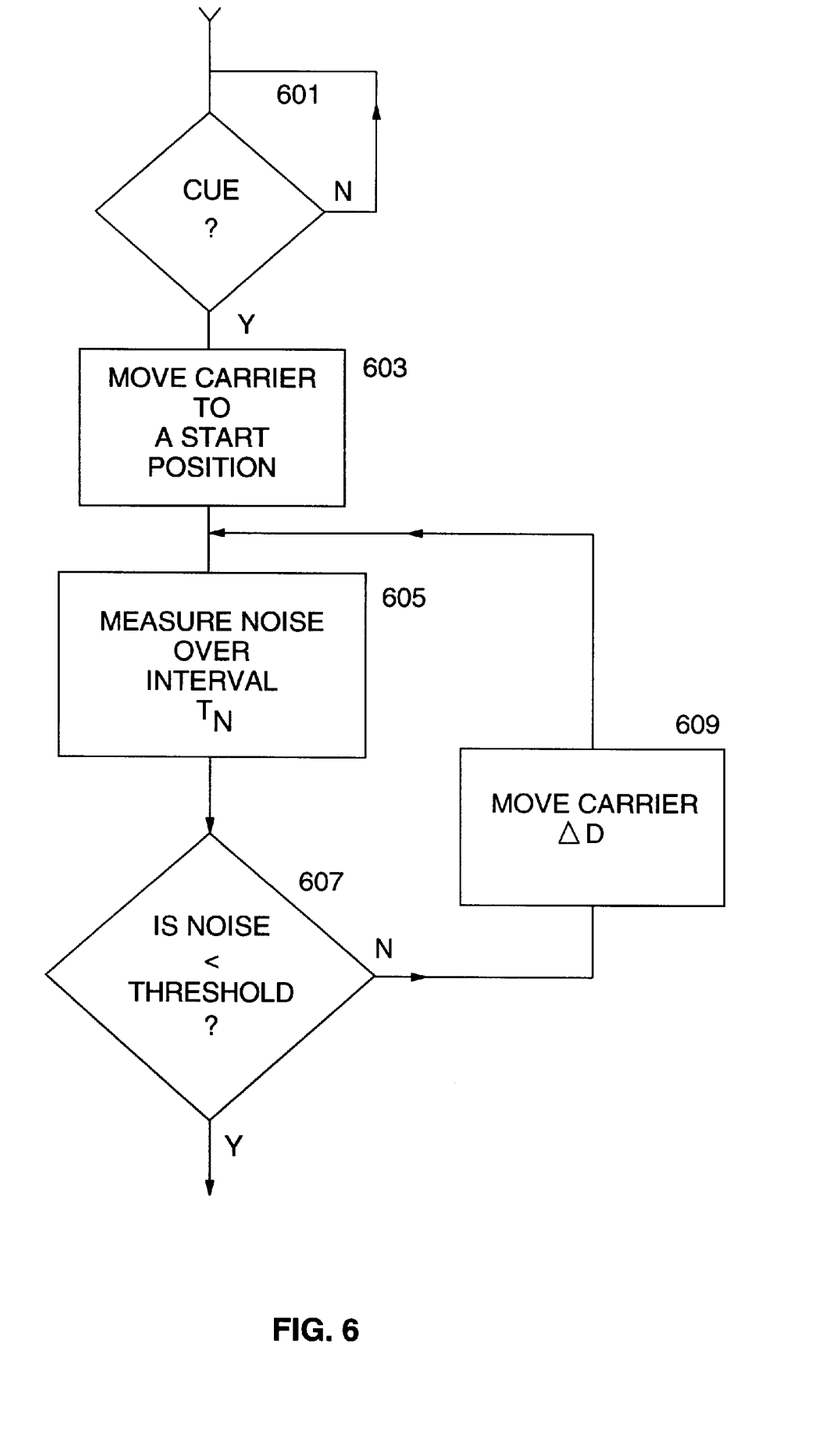
FIG. 6 is a flow chart illustrating another embodiment of the method of the present invention.

FIG. 6 depicts an alternative embodiment wherein the carrier is positioned at the first position wherein the background noise measured at the MICR read head is determined to be below a noise threshold. Once an acceptable position is found the carrier is left at the location and MICR document processing can begin. This carrier position may be used as a starting position the next time a MICR document is read. In step 601, the shield position determination process is kicked off by some sort of cue (i.e., MICR read command etc. . . . ). In step 603 the magnetic shield carrier is moved to a first position from which background noise measurements will be taken. This could be the beginning of the effective range or the last known position to produce a background noise level below the noise threshold or some other position. In step 605 the background noise is measured over interval $T_n$. Note that based on the cue, $T_n$ may vary. The interval may be shorter if a carrier shielding position is to be determined prior to each MICR document read. In step 607 a check is made to determine whether the background noise measurement is below the noise threshold. If not, the carrier is moved to the next position in step 609 and the noise is measured at this new position in step 605. Note that the distance the carrier is moved is limited only by the capabilities of the carrier positioning means. If a step motor is used to position the carrier then carrier position can be changed by a single motor step if desired. This processing continues until a position is found that yields a measurements below the noise threshold or all positions have been checked. If all positions have been checked with none yielding the desired noise level then the position yielding the lowest noise value may be selected and/or a message prepared for the operator indicating to the cashier that too much noise is present at the MICR read head or directing the cashier to adjust the display.

Figure 7:
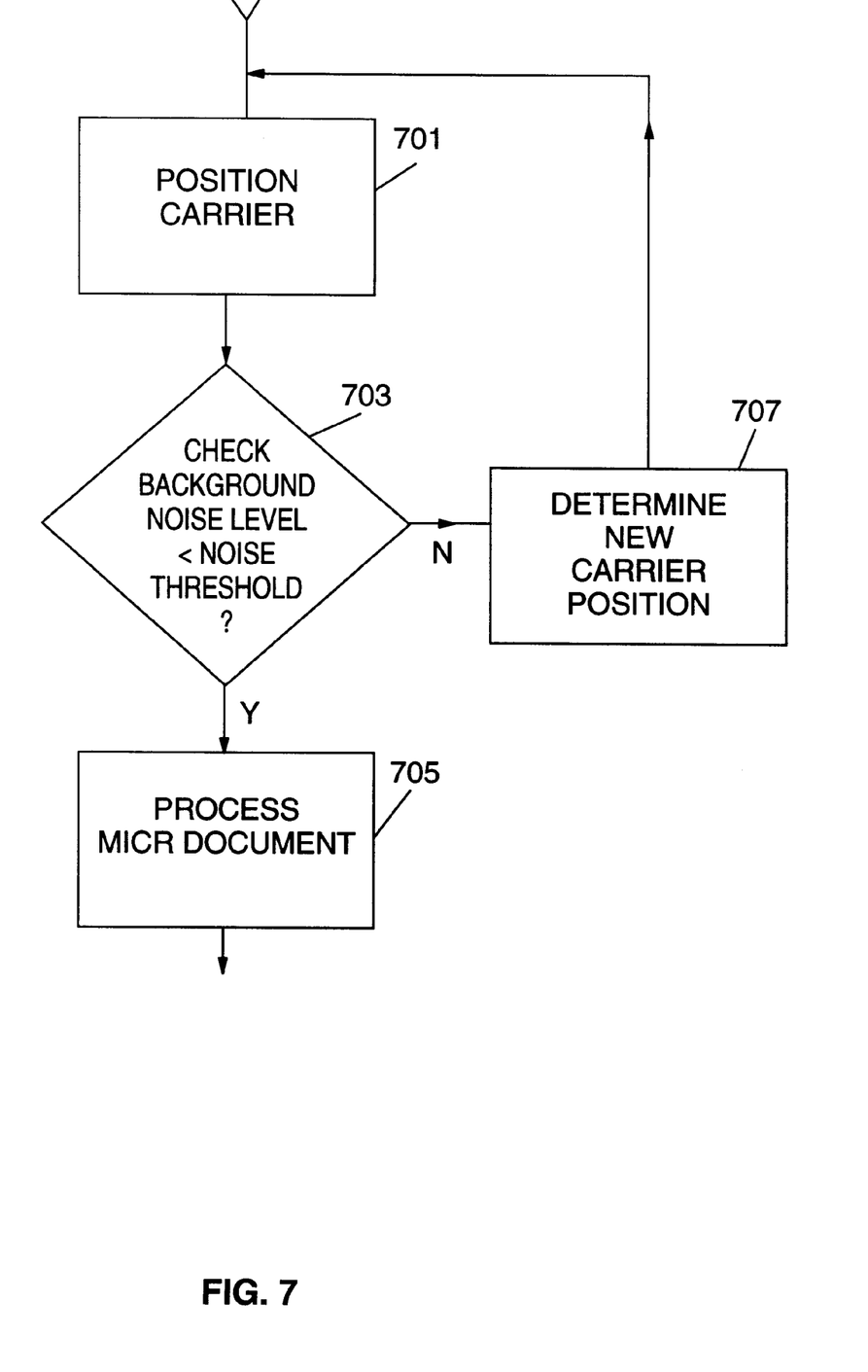
FIG. 7 is a flow chart illustrating another embodiment of the method of the present invention.

FIG. 7 depicts the method of reading magnetic ink characters from a document in accordance with the present invention. As depicted in step 701 the carrier with shielding material is moved to a selected position. This position may be determined by any of the methods described above. If the carrier position is not determined just prior to the reading of the document then step 703 may optionally be carried out. Step 703 performs a background noise measurement and checks to make sure that the background noise is below a specified threshold. In a system where the selected position is infrequently determined, step 703 performs a useful check to make sure that magnetic conditions at the read head have not changed substantially from when the selected position was determined. As shown in step 707, if the measured background noise exceeds the threshold then the carrier can be positioned at another location using any of the previously described techniques (see FIG. 5 and 6 and associated description). The MICR document is then processed, in step 705. Of course steps 701 and 703 may not need to be performed if the carrier is already at the desired position (i.e., the process of determining a location that reduces the magnetic noise leaves the carrier at the desired location just prior to MICR reading).

The magnetic shielding material can be located in positions that will cause the background noise level to increase at the read head rather than decrease. The magnetic shield is shunting the magnetic lines of force and can shunt them towards the read coils in which case the apparent noise levels increase above quiescent values. This condition would be realized during calibration and would be rejected since it is not a minimum value or a value beneath the threshold.

FIG. 9 shows the preferred embodiment of the shape and orientation of the magnetic shielding material with respect to the print head carrier. Any material with magnetic shielding properties may be used. The preferred material for the shield is highly permeable nickel-copper alloy such as mu-metal. FIG. 9 shows a piece of rectangular shaped highly permeable nickel-copper alloy mounted on the carrier. However other magnetic shielding materials may be used. The shape of the magnetic material can be any shape or shaped to meet the particular constraints of a particular display or display type.

Although the present invention has been described with a carrier accommodating both the print head and magnetic shielding material, a separate carrier could be provided for each. Also some print technologies do not requires a carrier, for instance certain laser printing technologies, a movable carrier could be provided to accommodate the magnetic shielding material The present invention may also be combined with other magnetic noise reduction techniques to further reduce noise. These techniques include using a second sensing coil, shielding the MICR read head and the techniques described in IBM Docket No.: RA9-96-048 entitled "A Method, Apparatus And Article Of Manufacture For Filtering Periodic Noise From A Magnetic Read Head" Ser. No.: 08/831, 267 filed Mar. 31, 1997 hereby incorporated by reference.

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed:

1. An apparatus for decoding magnetically encoded information comprising:
    a magnetic read head for providing a time varying electrical signal;
    a piece of magnetic shielding material mounted on a carrier;
    means for measuring the background noise;
    means for positioning the carrier along at least one axis relative to the magnetic read head;
    means for selecting a position for the carrier by positioning the carrier at one or more positions and measuring the background noise at each position and selecting a carrier position based on the noise measurements; and,
    wherein said carrier is positioned by the positioning means at the selected position prior to decoding of magnetically encoded information.

2. The apparatus of claim 1 further comprising a
    a decoder for decoding the time varying electrical signal generated by a magnetic read head when a MICR document is passed near the read head.

3. The apparatus of claim 1 wherein the means for determining the position of the carrier uses carrier positions within an effective range of the read head.

4. An apparatus for decoding magnetically encoded information comprising:
    a magnetic read head for providing a time varying electrical signal;
    a piece of magnetic shielding material mounted on a carrier;
    means for measuring the background noise;
    means for positioning the carrier along at least one axis relative to the magnetic read head;
    means for selecting a position for the carrier by positioning said carrier at a first position and measuring the background noise, if the background noise is less than a desired noise threshold then the first position is selected as the carrier position, else positioning the carrier to another position and measuring the background noise until a carrier position with a noise measurement below the desired threshold is determined; and,
    wherein said carrier is positioned by the positioning means at the selected position prior to decoding of magnetically encoded information.

5. The apparatus of claim 4 further comprising a
    a decoder for decoding the time varying electrical signal generated by a magnetic read head when a MICR document is passed near the read head.

6. The apparatus of claim 4 wherein the means for determining the position of the carrier uses carrier positions within an effective range of the read head.

7. An apparatus for decoding magnetically encoded information comprising:
    a magnetic read head for providing a time varying electrical signal;
    an amplifier for amplifying the time-varying electrical signal from the magnetic read;
    an A/D converter for converting the amplified time varying signal to a stream of digital samples;
    a magnetic shielding material mounted on a carrier;
    a carrier positioning means for positioning the carrier along at least one axis relative to the magnetic read head;
    a memory;
    a microcontroller;
    a background noise measurement module to determining a background noise measurement from samples collected with said carrier at a fixed position; and
    a carrier position determination module for causing the carrier position controller to position the carrier at a plurality of positions and cause the background noise module to determine background noise at each of the plurality of positions and to select a carrier position from the plurality of positions using the determined background noise, and then positioning the carrier at the selected position prior to reading a MICR document.

8. The apparatus of claim 7 wherein the carrier position determination module uses within an effective range of the read head.

9. An apparatus for decoding magnetically encoded information comprising:
    a magnetic read head for providing a time varying electrical signal;
    an amplifier for amplifying the time-varying electrical signal from the magnetic read;
    an A/D converter for converting the amplified time varying signal to a stream of digital samples;
    a magnetic shielding material mounted on a carrier;
    a carrier positioning means for positioning the carrier along at least one axis relative to the magnetic read head;
    a memory;
    a microcontroller;
    a background noise measurement module to determining a background noise measurement from samples collected with said carrier at a fixed position; and
    means for selecting a position for the carrier by positioning said carrier at a first position and measuring the background noise, if the background noise is less than a desired noise threshold then the first position is selected as the carrier position, else positioning the carrier to another position and measuring the background noise until a carrier position with a noise measurement below the desired threshold is determined.

10. The apparatus of claims 9 wherein the means for selecting a position uses positions within an effective range of the read head.

11. A point of sale printer comprising:

a document drive means, for moving documents inserted into the printer along a document travel path;

a magnetic reader positioned at a predetermined longitudinal position in said document travel path for providing a time varying electrical signal;

a print head positioned at about said predetermined longitudinal position in said document travel path, and wherein said print head is laterally offset from said magnetic reader;

a piece of magnetic shielding material attach to the print head;

means for measuring the background noise;

means for positioning the print head along at least one axis relative to the magnetic reader;

means for determining a position for the print head during magnetic reader operation by positioning said print head at a first position and measuring the background noise, if the background noise is less than a desired noise threshold then the first position is selected as the print head position, else moving the print head to another position and measuring the background noise until a print head position with a noise measurement below the desired threshold is determined; and, wherein said print head is positioned by the positioning means at the selected position prior to decoding of magnetically encoded information.

12. The point of sale printer of claim 11 wherein the means for selecting a position uses positions within an effective range of the read head.

13. A point of sale printer comprising:

a document drive means, for moving documents inserted into the printer along a document travel path;

a magnetic reader positioned at a predetermined longitudinal position in said document travel path for providing a time varying electrical signal;

a print head positioned at about said predetermined longitudinal position in said document travel path, and wherein said print head is laterally offset from said magnetic reader;

a piece of magnetic shielding material attach to the print head;

means for measuring the background noise;

means for positioning the print head along at least one axis relative to the magnetic reader;

a carrier position determination module for causing the carrier position controller to position the carrier at a plurality of positions and cause the background noise module to determine background noise at each of the plurality of positions and to select a carrier position from the plurality of positions using the determined background noise, and then positioning the carrier at the selected position prior to reading a MICR document; and wherein said print head is positioned by the positioning means at the selected position prior to decoding of magnetically encoded information.

14. The point of sale printer of claim 13 wherein the carrier position determination module uses positions within an effective range of the read head.

\* \* \* \* \*